United States Patent

[11] 3,604,457

| [72] | Inventor | Bradley C. Douglas<br>Kirkwood, Mo. |
|---|---|---|
| [21] | Appl. No. | 851,538 |
| [22] | Filed | Aug. 20, 1969 |
| [45] | Patented | Sept. 14, 1971 |
| [73] | Assignee | Emerson Electric Co. |

[54] PILOT-OPERATED FOUR-WAY VALVE SYSTEM
6 Claims, 3 Drawing Figs.

[52] U.S. Cl. ..................................................... 137/596.16,
137/625.64
[51] Int. Cl. ........................................................ F16k 11/10
[50] Field of Search ............................................ 137/609,
599.1, 601, 625.64, 596.16, 596.15, 625.43

[56] References Cited
UNITED STATES PATENTS

| 2,583,185 | 1/1952 | McLeod ....................... | 137/596.16 X |
| 2,754,840 | 7/1956 | Hicks, Jr. ..................... | 137/599.1 X |
| 3,038,500 | 6/1962 | Lansky et al. ................ | 137/596.16 X |

FOREIGN PATENTS
1,152,291   8/1963   Germany ..................... 137/596.16

*Primary Examiner*—William R. Cline
*Attorney*—Kingsland, Rogers, Ezell, Eilers & Robbins ABSTRACT: A pilot-operated four-way valve system. Two separate valves, one a high-pressure valve and the other a low-pressure valve are interconnected through a pilot valve. The high pressure and low-pressure valves each have a piston or slide the positions of which determine the direction of flow through alternate outlets from the valves. Opening or closing of the pilot valve establishes pressure conditions between the two valves to control the positions of the pistons therein.

In a heating and cooling system, the four-way valve system alternately converts the system to cooling or heating. Conversion is initiated by energization or deenergization of the pilot valve. The pistons are spring-biased to positions for circulating refrigerant in a cooling cycle. When the pilot valve is reversed, the pistons are subjected to changed pressure conditions causing them to slide and change the porting for the flow of fluid through a heating cycle.

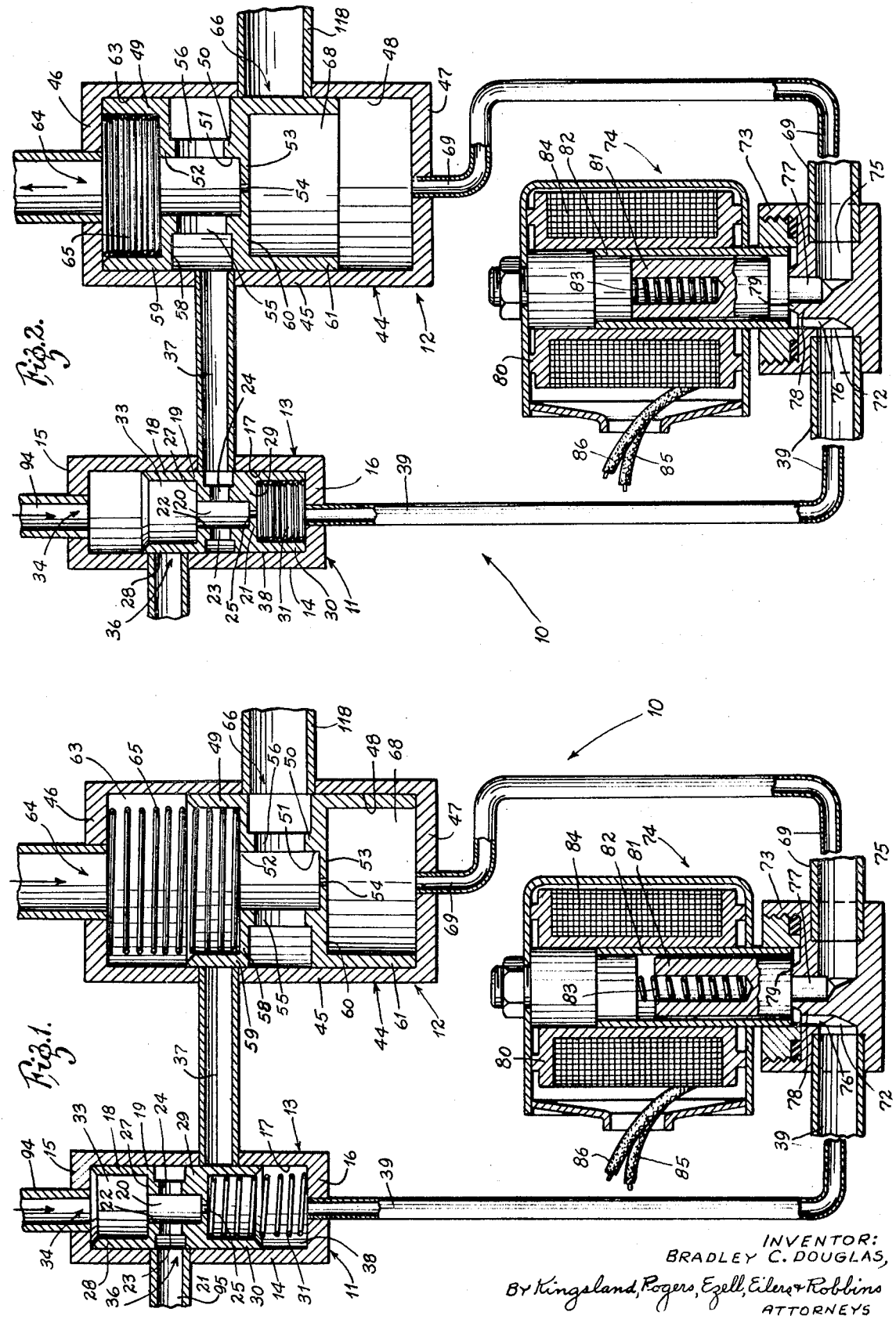

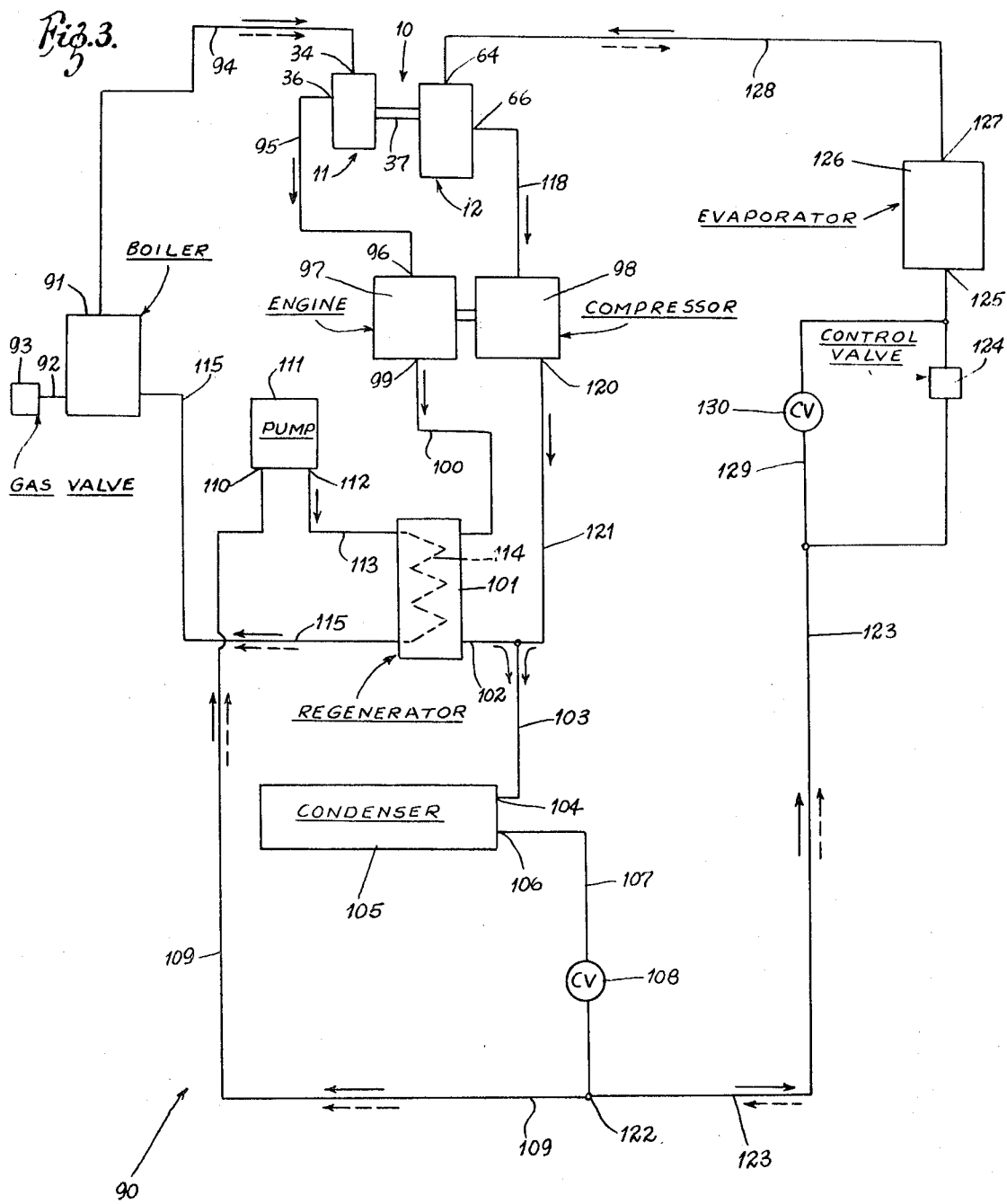

PILOT-OPERATED FOUR-WAY VALVE SYSTEM

BRIEF DESCRIPTION OF THE INVENTION

In the four-way valve assembly described herein, there are two valve housings, each having a valve chamber. A piston is slidable within each valve chamber. The pistons are biased to first positions and are slidable to second positions upon establishing a pressure drop past them.

One valve chamber is connectable to a high-pressure fluid source which is introduced on one side of the piston in that chamber. The other side of that piston is connected through a conduit to the other chamber on one side of the other piston. A pilot valve in the conduit is normally closed to block the flow of fluid but, when opened, permits high-pressure fluid to bleed through the bleed port in the first piston, flow through the conduit, and bleed through the bleed port in the second piston, thereby establishing a pressure drop to shift the pistons to the second positions.

The valve chambers have separate outlet ports which are alternately connected to their inlets depending upon the positions of the pistons. In one application of the valve system, connections in a heating and cooling system enable automatic changeover between heating and cooling cycles upon actuation of the pilot valve.

BRIEF DESCRIPTION OF THE DRAWINGS

FIG. 1 is a sectional view of the valve system showing the valves in the cooling cycle positions.

FIG. 2 is a sectional view of the valve system showing the valves in the heating cycle positions.

FIG. 3 is a schematic flow diagram of a heating and cooling system in which this valve system may be incorporated.

DETAILED DESCRIPTION OF THE INVENTION

The valve system 10, illustrated in FIGS. 1 and 2, may be incorporated in a heating and cooling system of the kind shown in FIG. 3, and which will be described, or it may be used in other combinations. The valve system 10 comprises a high pressure valve 11 and a low-pressure valve 12. The high-pressure valve 11 has a housing 13 comprising a cylindrical sidewall 14 and upper and lower end walls 15 and 16 defining a slide chamber 17 within them.

A piston 18 is slidable within the slide chamber 17. The piston 18 has a central stem 19 that has an internal recess 20 in it. The lower end of the recess 20 terminates in an end wall 21. A port 22 opens into the upper end of the recess 20, and ports 23 and 24 open through diametrically opposite sides of the stem 19 and communicate with the recess 20. A small bleed port 25 extends through the lower wall 21.

A radial wall 27 extends outwardly from the upper end of the stem 19 and leads to an upwardly extending annular skirt 28. Another radial wall 29 extends outwardly from the lower end of the stem 19 and leads to a downwardly extending annular skirt 30. A spring 31 is positioned within the annular skirt 30 and bears against the radial wall 29 and against the lower end wall 16 of the valve housing 13. The compression spring 31 biases the piston 18 upwardly to the position shown in FIG. 1.

The volume within the annular skirt 28 between the radial wall 27 and the upper end wall 15 of the housing 13 defines an inlet chamber 33. A pipe 34 for supplying high-pressure fluid opens through the upper end wall 15 of the housing 13 and communicates with the inlet chamber 33.

One outlet pipe 36 is connected through the sidewall 14 of the housing 13 and communicates with the port 23 when the valve 18 is in the position shown in FIG. 1. Another outlet pipe 37 opens through the sidewall 14 of the housing 13. The pipe 37 is vertically aligned with the port 24 but is blocked from communication therewith by the skirt 30 when the valve piston 18 is in the position illustrated in FIG. 1.

The volume within the housing 13 between the radial wall 29 and the lower end wall 16 of the housing 13 defines a pilot chamber 38. A pipe 39 opens through the end wall 16 of the housing 13 into communication with the pilot chamber 38 when the piston is in the position shown in FIG. 1.

The low-pressure valve 12 has a housing 44 comprising a cylindrical sidewall 45 and upper and lower end walls 46 and 47. A slide chamber 48 is defined within the cylindrical sidewall 44 between the end walls 46 and 47. A piston 49 is slidable within the slide chamber 48. The piston 49 has a stem 50 having an internal recess 51 with a port 52 opening through its upper end. The recess 51 has a bottom wall 53. There is a small bleed port 54 through the bottom wall 53. Diametrically opposing ports 55 and 56 open through the sidewall of the stem 50 to the recess 51.

A radial wall 58 extends outwardly from the upper end of the wall 50 to an upwardly extending annular skirt 59. Another radial wall 60 extends outwardly from the lower end of the stem 50 to a downwardly extending annular skirt 61.

The volume within the sidewall 45 of the housing 44 between the upper end wall 46 and the radial wall 58 defines an inlet chamber 63. A pipe 64 extends through the upper wall 46 into communication with the inlet chamber 63. A compression spring 65 is positioned within the annular skirt 49 and bears against the radial wall 58 and the upper end wall 46. The compression spring 65 biases the piston 49 downwardly to the position illustrated in FIG. 1.

An outlet pipe 66 extends through the sidewall 45 of the housing 44 and communicates with the port 56 when the piston 49 is in the position illustrated in FIG. 1. The pipe leading from the high pressure valve 10 extends through the sidewall 45 of the housing 44 in vertical alignment with the port 55 of the piston 49. However, the pipe 37 is blocked by the annular skirt 59 when the piston 49 is in the position illustrated in FIG. 1. The volume within the cylindrical sidewall 45 of the housing 44 between the radial wall 60 and lower end wall 47 defines a pilot chamber 68. A pipe 69 extends through the lower end wall 47 into communication with the pilot chamber 68 when the piston 49 occupies the position shown in FIG. 1.

The pipe 39 which leads from the pilot valve chamber 17 of the high-pressure valve 10 leads to an inlet port 72 in a valve housing 73 of a pilot valve 74. The pipe 69 which is connected to the pilot chamber 68 of the low-pressure valve 12 leads to an outlet port 75 in the pilot valve housing 73.

In the pilot valve housing 73, the inlet port 72 communicates with an inlet chamber 76. The outlet port 75 communicates with an outlet chamber 77. A sleeve 78 that separates the inlet chamber 76 from the outlet chamber 77 terminates in an annular valve seat 79. A solenoid 80 includes a valve member 81 that is slidable within a cylinder 82 mounted on the valve housing 73. The valve member 81 is biased downwardly to the position illustrated in FIG. 1 by a compression spring 83. A solenoid coil 84 is wound to draw the valve member 81 upwardly away from the valve seat 79 when it is energized, as shown in FIG. 2. The solenoid coil 84 is connected through conductors 85 and 86 to a suitable control switch (not shown) of a power supply (not shown).

Referring to FIG. 3, the four-way valve 10 is shown incorporated in a heating and cooling system 90. The heating and cooling system 90 comprises a boiler 91 that may be heated from any suitable heating source, such as gas, oil or electricity. In this example, a pipe 92 is shown for supplying gas through a suitable control valve 93. A pipe 94 leads from the boiler 91 to deliver vapor to the inlet port 34 of the high pressure valve 11.

The outlet port 36 from the high-pressure valve 11 is connected by a pipe 95 to the inlet 96 to an engine 97, such as a turbine. The engine 97 is mechanically connected to a compressor 98 to power the operation of the compressor 98. The high-pressure fluid flows from the engine outlet 99 through a pipe 100 to a regenerator 101. From the regenerator 101, the fluid flows through a pipe 102 to a pipe 103 that leads to the inlet 104 of a condenser 105. The outlet 106 from the condenser 105 is connected by a pipe 107 through a check valve 108 to a pipe 109. The pipe 109 is connected to the inlet 110 of a pump 111. The discharge side 112 of the pump 111 is connected by a pipe 113 to a circulating coil 114 wound through the regenerator 101. The circulating coil 114 leads to a pipe 115 that returns the fluid to the boiler 91.

The outlet port 66 from the low-pressure valve 12 is connected by a pipe 118 to the suction side of the compressor 98. The discharge outlet 120 from the compressor 98 is connected by a pipe 121 to the pipe 103 leading to the condenser 105.

A junction 122 from the pipes 107 and 109 includes a connection to a pipe 123 leading through a control valve 124 to the inlet 125 to an evaporator 126. The outlet 127 from the evaporator 126 is connected by a pipe 128 to the inlet port 64 to the low pressure valve 12.

A bypass pipe 129 is connected across the valve 124. There is a check valve 130 in the bypass pipe 129.

OPERATION

Although this valve system 10 is useful in other applications, it works well as the control valve system for a heating and cooling system of the kind shown in FIG. 3.

Operation of the valve system 10 is under the control of the pilot valve 74. Although the pilot valve 74 may be manually or mechanically actuated, it is conveniently operated by the alternate energization and deenergization of the solenoid 80.

For the cooling cycle, the solenoid 80 is deenergized. This lets the spring 83 drive the valve member 81 downwardly against the valve seat 79 to close the valve. When the valve 74 is closed, no fluid can flow between the pipes 39 and 69.

With the pilot valve 74 closed, refrigerant vapor generated in the boiler 91 flows through the tube 94 and enters the inlet port 34 of the valve 11. This vapor flows into the recess 20 through the port 22 and bleeds through the bleed port 25 into the pilot valve chamber 17. Since the pilot valve 74 is closed, the fluid communication established through the bleed port 25 equalizes the pressures in the pilot valve chamber 17 and the inlet chamber 33. As a result, the compression spring 31 exerts a net upward force moving the piston 18 to its upper extreme position illustrated in FIG. 1. In this position of the piston 18, the opening 23 in the piston is aligned with and in communication with the outlet port 36, whereas the sidewall 30 of the piston 18 is in a position blocking the tube 37. Accordingly, vapor flows through the high pressure valve 11 and the outlet port 36 through the tube 95 to the inlet 96 to the engine 97. From there, the fluid flows through the regenerator 101, through the tube 103 to the condenser 105 from which it is drawn through the tubes 107 and 109 to the pump 111. From the pump 111, the fluid is pumped through the regenerator coil 114 where it is heated from its circulation in proximity to the fluid entering from the tube 100. From the regenerator, the fluid returns through the tube 115 back to the boiler 91.

The circulation of vapor through the engine 97 drives the engine 97 to power the compressor 98. Operation of the compressor 98 circulates refrigerant in a cooling cycle through the tube 121, the tube 103 to the condenser 105 where the refrigerant gives up heat and is condensed. From the condenser 105, the now liquid refrigerant flows through the tube 107 and the check valve 108 to the tube 123 and then through the expansion valve 124 to the evaporator 126. In the expansion valve 124, the pressure of the refrigerant is reduced, and in the evaporator 126 the refrigerant is evaporated as it absorbs heat. The refrigerant flows from the evaporator 126 through the tube 128 to the port 64 of the low pressure valve 12. The refrigerant flows through the port 64, the chamber 63, the port 52, the recess 51, and the port 56 to the port 66 and then through the tube 118 back to the compressor 98.

Since the pilot valve 74 is closed, the pressure in the inlet chamber 63 and the pilot chamber 68 of the low-pressure valve 12 is equalized through the bleed port 54. Hence, the spring 65 exerts thus net force driving the piston 49 downwardly to the position illustrated in FIG. 1. The pistons 18 and 49 are spring biased to the cooling positions as illustrated in FIG. 1 to minimize the pressure drop on the suction side of the compressor 98 and thus obtain maximum efficiency of operation. This eliminates any additional pressure drop that would otherwise be required to hold the valves in the cooling position. Also, the pilot valve 74 is closed during the cooling cycle to eliminate the flow of hot gas from the high pressure valve 11 to the low-pressure valve 12 and on to the compressor 98, which would decrease compressor efficiency.

To reverse the valves 11 and 12, the pilot valve 74 is energized. This draws the solenoid core 81, which is the valve member, upwardly to the position shown in FIG. 2, opening communication between the inlet chamber 76 and the outlet chamber 77 so that fluid can flow from the tube 39 to the tube 69. Now, since the bleed port 25 in the piston 18 restricts the flow of the relatively high-pressure vapor from the inlet chamber 33 to the pilot chamber 17 of the valve 11, the fluid now being freed to flow out of the pilot chamber 17 through the pilot valve 74, the resulting pressure drop causes a higher pressure to exist in the inlet chamber 33 than in the pilot chamber 17. This pressure differential is sufficient to overcome the force of the compression spring 31 and move the piston 18 downwardly to the position shown in FIG. 2.

Likewise, although the pressure of fluid flowing through the tubes 39 and 69 to the pilot chamber 68 of the valve 12 is below the boiler pressure because of the restriction of the bleed port 25, the pressure in the pilot chamber 68 is nevertheless higher than the evaporator outlet pressure in the inlet chamber 63 of the valve 12. Since the bleed port 54 restricts the flow of fluid from the chamber 68 to the chamber 63 and produces a pressure drop, with the pilot the pilot 74 open, there is a net pressure differential between the pilot chamber 68 and the inlet chamber 63. This net pressure differential overcomes the force of the compression spring 65 and moves the piston 49 upwardly to the position shown in FIG. 2.

With the pistons 18 and 49 of the valves 11 and 12 in the positions shown in FIG. 2, the flow of vapor from the boiler through the inlet port 34 is blocked from flowing on to the engine 97 by the annular skirt 28 of the piston 18. Likewise, the outlet port 66 of the valve 12 leading to the suction side of the compressor 98 is blocked by the annular skirt 61 of the piston 49. On the other hand, a flow path is now established from the inlet port 34 of the high-pressure valve 11 through the recess 20, the port 24 and through the pipe 37 to the port 55 of the low-pressure valve 12. The vapor can flow through the port 55 and the recess 51 to the coil 126, which now acts as a heating coil. Thus, this hot vapor from the boiler now flows from the port 64 through the tube 128, through the coil 126 to give up heat, through the tube 129 and check valve 130 bypassing the expansion valve 124, through the tube 123, the tube 109 and the pump 111. From the pump 111, the vapor flows through the regenerator coil 114 and then back to the boiler 91. During this heating cycle, the engine 97 and the compressor 98 are, of course, inoperative.

For the valves 11 and 12 to remain in the heating conditions, there must be a pressure differential between the inlet port 34 of the valve 11 and the outlet port 64 of the valve 12. If this differential becomes insufficient to hold the pistons 18 and 49 in the positions of FIG. 2, against the forces of the compression springs 31 and 65, the pistons will move to reduce the effective size of the flow passage through the tube 37 to automatically produce the necessary pressure drop and hold the valves in the heating cycle positions.

To revert again to the cooling cycle, the pilot valve 74 is again deenergized to actuate the valves 11 and 12 as has already been described.

What is claimed is:

1. A valve assembly comprising a first valve chamber, a second valve chamber, an inlet to the first valve chamber, first and second outlets from the first valve chamber first, second and third ports opening to the second valve chamber, a first fluid conduit interconnecting the second outlet of the first valve chamber and the third port of the second valve chamber, a first valve member in the first valve chamber, means to bias the first valve member to a position establishing communication between the inlet and first outlet and blocking communication between the inlet and the second outlet of the first valve chamber, a second valve member in the second valve chamber, means to bias the second valve member to a position establishing communication between the first and second ports and blocking communication between the first and third ports of the second valve chamber, and a pilot valve means operable for permitting restricted flow of fluid from the inlet of the first chamber past the first and second valve members to create a pressure drop across the valve members to move them to positions blocking the aforesaid communications and establishing communications between the inlet and second outlet of the first valve chamber on the one hand, and between the first and third ports of the second valve chamber on the other to thereby establish communication between the inlet of the first valve chamber and the first port of the second valve chamber.

2. The valve assembly of claim 1 wherein the valve members comprise pistons, a flow-restricting bleed orifice through each piston to provide the said restricted flow.

3. The valve assembly of claim 2 including second conduit means interconnecting the chambers in a series which series includes the inlet to the first valve chamber, the bleed orifice in the first piston, the second conduit means, the bleed orifice in the second piston, and the first port of the second valve chamber, the pilot valve means being connected to alternately block and unblock the second conduit means.

4. A valve assembly comprising first and second valve chambers, means to deliver fluid to the first chamber, a first valve member in the first chamber, means biasing the first valve member to a position to cause discharge of the fluid through a first outlet, means responsive to the creation of a pressure drop across the first valve member to move the valve member to another position to cause discharge of the fluid through a second outlet, a second valve member in the second chamber, means biasing the second valve member to a position to establish communication between first and second ports opening to the second chamber, means responsive to the creation of a pressure drop across the second valve member to move the second valve member to a position blocking communication between the first and second ports and establishing communication between the first port and a third port opening to the second chamber, and pilot valve means operable to create the pressure drops across the first and second valve members simultaneously.

5. A valve assembly comprising valve housing means, a first chamber within the housing means, a second chamber within the housing means, a first piston having first and second sides slidable within the first chamber, a second piston having first and second sides slidable within the second chamber, an inlet to the first chamber communicating with the first side of the first piston, means to connect the inlet to a source of high-pressure fluid, a first outlet communicating with the first chamber, a second outlet communicating with the first chamber, the first piston being slidable to a first position establishing communication between the inlet and the first outlet and blocking communication between the inlet and the second outlet and to a second position establishing communication between the inlet and the second outlet and blocking communication between the inlet and the first outlet, first, second, and third ports communicating with the second chamber, the second piston being slidable to a first position establishing communication between the first and second ports and blocking communication between the first and third and between the second and third ports and to a second position establishing communication between the first and third ports and blocking communication between the first and second and between the second and third ports, a conduit interconnecting the first chamber on the second side of the first piston with the second chamber on the first side of the second piston, a pilot valve in the conduit for blocking and unblocking the conduit, means to bleed fluid delivered by the inlet from the first to the second side of the first piston and to impart a pressure drop during such bleeding, means to bleed fluid supplied by the conduit from the first to the second side of the second piston and to impart a pressure drop during such bleeding, means to bias the first piston in a direction away from the inlet, and means to bias the second piston in a direction away from the interconnection of the conduit.

6. The valve assembly of claim 5 wherein the pilot valve is normally closed, and a solenoid energizable to open the pilot valve.